3,456,066
CABLE SPACER
Charles L. Petze, Jr., New Castle, Del., assignor to
Delaware Research & Development Corporation
Filed Oct. 23, 1965, Ser. No. 503,328
Int. Cl. H01b *17/16*
U.S. Cl. 174—146       10 Claims

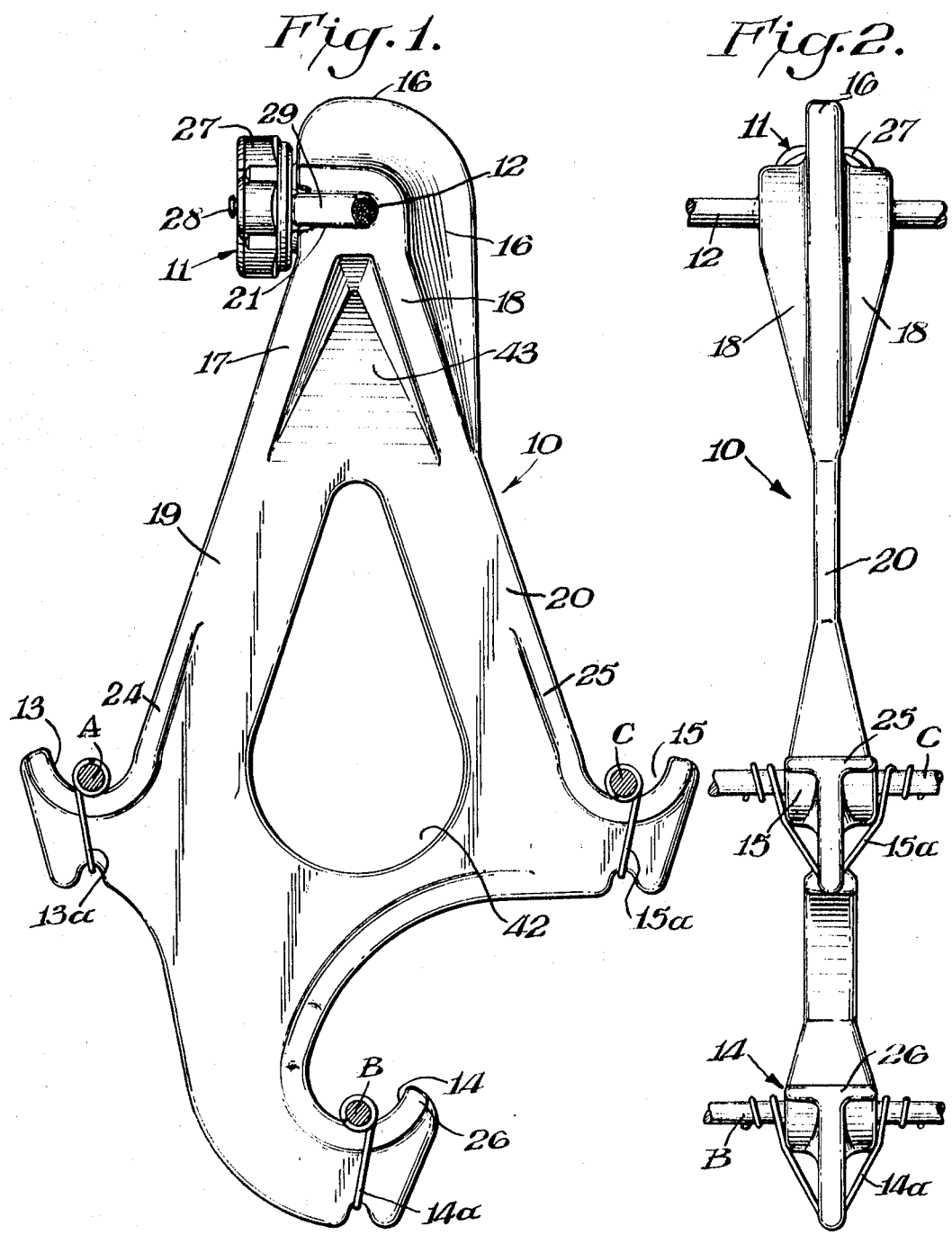

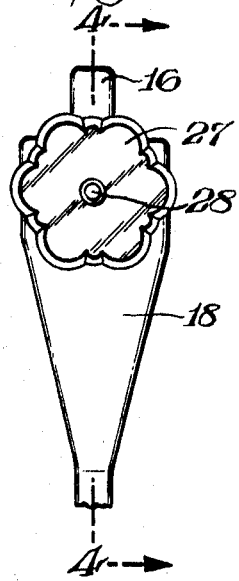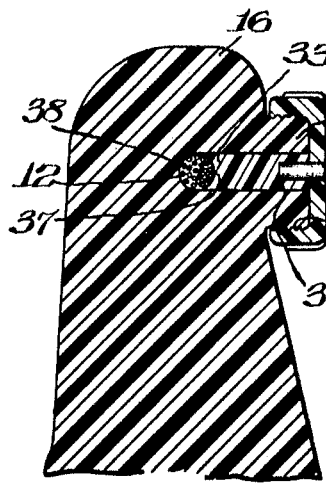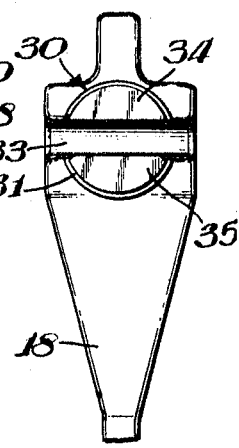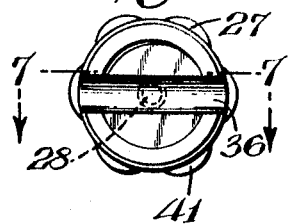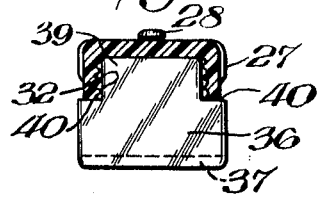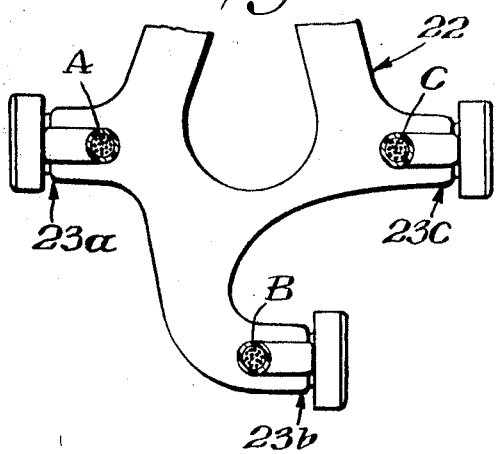

ABSTRACT OF THE DISCLOSURE

A cable spacer is provided which is straight-lined and symmetrical and which is smooth surfaced being without sharp projections, fins or other physical discontinuities so that uniform surface resistance is maintained thus providing for uniform resistance over the entire device and for minimum possibility of capacitance coupling to ground. The uppermost insulated phase conductors are so positioned that the distance from the uppermost phase conductor to the messenger wire to greater than two-thirds the distance from said wire to the lowest phase conductor. A polypropylene polymer containing an organopolysiloxane is used in making the device, and the geometry of the device and its chemical make up are such that there is a basic impulse flashover voltage that is in excess of 150,000 volts.

---

This invention relates to apparatus for simultaneously supporting and separating aerial electric cables in a desired configuration. More particularly, it relates to an aerial cable spacer providing service dependability by virtue of its construction and composition.

As is well known, aerial cables carrying electrical power are suspended from poles and towers in fairly close proximity. Spacers attached to a messenger or carrier wire, which may be grounded, are used to support and separate the insulated phase conductors. For example, in a mile of suspended cables there may be used two hundred or so spacers, each of which is functioning also as an insulator. Thus, at two hundred or so places the possibility of capacitive coupling to ground is increased, and possible damage to the capable is increased because a given spacer may be improperly designed or contain a poor or faulty dielectric material. Use of spacers necessarily increases the probability of service failure, for spacers are known to be trouble makers since breakdowns occur at or close to the junction of the spacer and the cable.

The difficulties encountered relate, of course, to the given spacer being used. Therefore, a study was made of a large variety of commercially available spacers. In the study the spacers were subjected to a number of tests and failures were analyzed. Based on the extensive testing, it was determined that an ideal spacer should have as high an impedance as possible. This requires minimum capacitance and maximum surface resistance at normal humidity and when wet. The dielectric material of which the spacer is made must be a durable, hydrophobic material that resists dirt accumulation and attack by corona discharge and by the weather conditions; it must have a low dielectric constant and high resistivity. Preferably, it should have low electrical losses. The surface resistance must be uniform over the entire area of the assembly especially when it is exposed to moisture. The spacer should not require metal hardware, which may reduce flashover path length. Further, there should be no sharp projections, fins or other physical discontinuities that may act as foci for corona discharge or that may interfere with the maintenance of the uniform surface resistance.

An objective of this invention is the provision of a spacer which satisfies the above criteria. Another purpose is the development of a spacer which is light in weight yet has little or no sag under all conditions under the weight load of the cables, accumulated ice and high wind loadings, besides being resistant to breaking under impact. A still further aim is providing a spacer which is so shaped to reduce the probablities of failures. Another goal is the provision of a strong mounting-means which maintains the built-in electrical uniformity of the spacer. These and other objectives will appear hereinafter.

The objectives of this invention are accomplished by the provision of a support which is substantially symmetrical and is non-metallic and contains an integral, positive locking holding element for the messenger wire. The support preferably is designed and constructed so that the distance from the insulated phase conductors uppermost (A or C of FIGURE 1) and the messenger wire (12 of FIGURE 1) is greater than two-thirds of the distance from the messenger wire to the lowest phase conductor (B of FIGURE 1) and the distances between insulated phase conductors, A, B and C, are the maximum distances permitted by various electric utility construction standards for aerial spacer cables. The purposes of these geometrical relationships are to contribute to attainment of maximum flashover voltage strength and of minimum surface current. Since the spacer of this invention is nonmetallic, the messenger cable is the nearest point of ground to any of the conductor cables supported by the spacer.

At the top of the device of this invention there is a relatively massive neck which contains the integral binding or holding means that contains the messenger wire on which the support hangs. This neck contains ribs or ridges for strength purposes with minimum weight and these ridges terminate in side arms that lead in a straight inclined manner to the saddles for the A phase and the C phase insulated conductors. These arms are thinned down in order to reduce weight and to reduce capacitive coupling effects. Centrally located between the two saddles for the A and the C cables and below those saddles is a third saddle, the one for the B phase cable. Each of the saddles contains a reinforcing ridge which extends the width of the saddle beyond the thickness of the supporting arms. This provides a substantial distance on which the given cable may rest. The device of this invention has all of the edges in it well rounded, and the surfaces leading to the insulated conductors that are supported by the device are surfaces that lead water and contaminants away from the cable.

When any insulated conductor is supported, there is always the possibility of having capacitance coupling to ground at the point of support. This creates a distortion of the electrical field and presents a hazard and a possibility of failure of the insulated conductor. Accordingly, the above described elements have been devised to present a uniformity of surface conditions so that the resistance involved is uniform over the entire device and so that the possibility of capacitance coupling to ground is minimized. In addition to the physical approach to minimize the adverse effects, this invention involves the provision of a particular chemical composition for the spacer. As will be understood further in the description which follows, there are certain properties of the chemicals involved in the supporting of cables that are important. This invention involves the elimination of all metallic parts in the supporting of cables and it involves the provision of a preferred polypropylene composition which affords the necessary tensile strength, yet gives a minimum of capacitive coupling possibilities due to the electrical properties of the kind of polymeric compound involved. This invention will be further understood with reference to the description below and to the drawings, all of which is given for illustrative purposes only and is not limitative.

In the figures:

FIGURE 1 is a front elevation of the device of this invention showing the device attached to a messenger wire and supporting three insulated phase conductors or cables;

FIGURE 2 is an end view;

FIGURE 3 is a detailed view showing the hand nut of the holding means for the messenger;

FIGURE 4 is a sectional view taken on line 4—4 of FIGURE 3;

FIGURE 5 is the view of FIGURE 3 with the said hand nut removed;

FIGURE 6 is a bottom plan of said hand nut;

FIGURE 7 is taken on line 7—7 of FIGURE 6; and

FIGURE 8 is a front elevation of another embodiment of this invention in which the holding means is used at several places to hold insulated conductors.

As shown in FIGURE 1 the support 10 of this invention has an upper section which comprises the means 11 for attaching it to the messenger wire 12 which holds up the support and anything resting on the support. It will, of course, be understood that the said messenger wire and the insulated conductors are supported by poles, or the like and that the spacers are used at and at some distance from such poles or towers. In FIGURE 1 insulated phase conductors A, B and C are shown resting in the respective saddles 13, 14 and 15. In order to hold all of the weight that is involved the device must contain a sufficient amount of material having the proper tensile strength. Thus, in the neck portion there are extending ribs 16, 17 and 18. The rib 16 is a rounded section that extends up to and beyond the said holding means 11. The ribs 17 and 18 are on both sides of the device and as shown they extend downwardly into the arms 19 and 20, respectively, and they extend upwardly to form the mouth 21 which receives messenger wire 12.

As can be seen in FIGURE 1 the sides 19 and 20 are straight-lined, inclined arms that go down as straight as practical to the saddles 13 and 15. At the end of the straight line of the arms there is the curved part of the saddle which receives the particular cable A or C as shown. It will be appreciated that the given cables shown in FIGURE 1 are small and that in the field these cables can also be so large that they completely or almost completely fill the curved area of the respective saddle 13, 14 or 15.

It can also be seen in FIGURES 1 and 2 that the saddles have supporting ridges 24, 25 and 26 which comprise extensions of the material beyond the thinner arm sections. These ridges give the desired strength in the saddle area and the desired widths for the cable support. This width, which can be seen in FIGURE 2, will vary from about 1.0 inch to about 2.0 inches with 1.5 inches being preferred. Thus, the cable that is being supported is not resting on a point contact or a contact which is very narrow. Such contacts are to be avoided, since they result in extensive distortion of the insulation around the cable at the point of support, and this weakens the insulation and frequently results in electrical and mechanical failures.

In FIGURE 1 the holding means for the messenger wire 12 comprises a hand nut 27 which rotates around headed pin 28 which is connected to gripping member 29. In order to more fully understand the holding means reference is made to FIGURES 3–7. In the cross-sectional view given in FIGURE 4 it can be seen that at the top of the spacer as part of the top member 16 there is an extension 30 which contains threads 31. These threads are well rounded to obtain the best possible electrical properties and the inner threads 32 of hand nut 27, shown in FIGURE 7, are also well rounded. Present in the top section 16 is a slot 33 which has a width that is adequate to receive the largest of the messenger wires that are in general use. This slot 33 is best seen in FIGURE 5 where is also shown that the threaded extension or knob 30 consists of two halves 34 and 35. This construction allows the messenger wire to be slipped into place prior to the placement of the holding means 11 on knob 30. The slot 33 has a substantial length in order to support a substantial length of the messenger wire and in order to prevent swaying or pivoting of the support on the messenger wire. This length is from about 1.5 to 2.5 inches and is generally about 2 inches long.

Also, as shown in FIGURE 4, the pin 28 extends through the handle 27 and is embedded in and is part of the grooved slider or bearing 36. This slider has an arcuate end 37 which fits up snugly against the messenger wire 12 when the holding means is tightened up sufficiently. Thus, the messenger wire 12 is held securely between the arcuate surface 37 of the bearing member 36 and the arcuate inner surface 38 in groove 33 in the neck section 16 of the spacer.

The slider has an extension 39 which fits into the hand nut 27 as shown in FIGURE 7. This extension receives the pin 28 as discussed above and the hand nut 27 rotates around the rivet 28 and extension 39, and as it rotates it bears against shoulders 40 on slider 36. Thus, when the threads 32 in hand nut 27 are being wound up on threads 31 of knobs 34 and 35 the slider will be moved inwardly, for it is pushed inwardly by the handle 27 as it moves closer to the messenger wire 12. Eventually the said arcuate surfaces 37 and 38 bind against the outer surfaces of the given messenger wire 12 and this locks the assembly into position, all of which may be done without the use of a tool.

While this holding means has been described with particular reference to the spacer of this invention, the use of this holding means is not limited to spacers. The holding means of this invention can be used for locking into place and supporting a large variety of pieces of equipment.

In the embodiment 22 of this invention as shown in FIGURE 8, which, for convenience, is fragmentary and does not show the holding means at the top and the messenger wire, one of the locking devices of this invention has replaced each of the saddles 13, 14 and 15 so that now cables A, B and C are supported and held into locked position by a locking device of this invention, 23a, 23b and 23c, respectively. It is not necessary to have at these places the relatively massive supporting ribs 16, 17 and 18, for the load at failure is only one-third of the load at the messenger. Further, the cables are more thoroughly protected at the places of support than they are in the open saddles, and conventional coil holders 13a, 14a, and 15a shown in FIGURE 1 are eliminated.

The thickness of the various parts is designed to be not thicker than necessary for the essential tensile strength, and parts, including the rounded sections 41 on hand nut 27, are very smooth and well rounded. Further, to cut down weight the central section of the spacer is a hole 42 and thick neck with its ribs 17 and 18 thinned down, leaving hollow section 43 which is also well rounded to lead water and contaminants off the device and to reduce adverse electrical effects.

In addition to the physical elements described above, this invention involves a chemical approach toward effective spacers that have a long life and that allow a minimum of possibility for damage by electrical effects. All metal parts are eliminated, for it has been found that these may cause damage due to the electrical effects that they create. The materials that are used in the spacers of this invention have dielectric constants below 4 to 60 cycles per second and preferably have dielectric constants of about 2.0–2.3. Further, the chemical material and the geometry of the spacers are such that there is a basic flashover voltage that is in excess of 150,000 volts.

A number of organic polymeric materials can be used including polypropylene, polypropylene co-polymers with ethylene, polymethylmethacrylate and polyvinylchloride. Of these, polypropylene polymers are preferred, and it is further preferred to incorporate into them an organic polysiloxane gum that has an average molecular weight above 500,000. These gums can be any of several polymerized materials such as dimethyl polysiloxane, methyl phenyl polysiloxane, and ethyl phenyl polysiloxane and may be purchased from a number of companies including the Union Carbide Corporation, Silicones Division which sells one of these gum types under the designation "W-98." These gums generally have densities below 1 and they are clear viscous materials that may be incorporated with the copolymers making up the main body of the material of the spacer. The gums are used in amounts of about 1% to about 15% based on the total weight of the material in the spacer with amounts of about 2% to about 5% by weight being preferred.

While omission of the polysiloxane results in a spacer of somewhat increased strength and lower cost, the omission results in a decrease of the water repellancy of the spacer. For this reason it is preferred to use compositions that contain the gum and of the various polymers that are operable it is preferred to use a polypropylene ethylene co-polymer, for it has been found that it affords the best combination of mechanical and electrical properties in the material of which the spacer is made. Such co-polymers are available commercially under the designation Avison Olemer type TD-321 and TD-321G.

By this invention a spacer of low weight that has a contoured surface that minimizes surface contamination is made available. The impedance is high, the surface being electrically very resistant and the capacitance to ground being at a very low probability. The spacer of this invention is made of durable, hydrophobic, low-dielectric constant material that resists dirt accumulation, wetting effects and attack by corona. The spacing between the A and C phases is at a maximum as are the other dimensional requirements such as the distance of these phases to the messenger wire. Further, the spacer contains no metallic materials whatsoever and the means of assembling the spacer on the messenger or the means for holding an insulated conductor is a direct, positive locking means which holds the spacer on the messenger and the said conductors in a stable manner without the use of any tools. The spacer of this invention also has a minimum of discontinuities such as sharp projections or fins so that there is a minimum number of foci for corona. The flashover voltage is very high even under very wet conditions.

The flashover voltage strength of the spacer of this invention is at least 40 kv. in a wetting period that is equivalent to about 5 inches of rain fall in one minute, which is far more than experienced in usual rain storms. The amount of surface current under such conditions does not exceed 20 milliamperes at an applied voltage of 20 kv.; that is, it does not exceed one milliampere per kv. Under the said wetting conditions the visible corona starting voltage of the spacer of this invention is greater than 13.2 kv., this being higher than the line voltage at which many spacer circuits operate. In addition to these advantages the spacer of this invention does not become contaminated very easily, has a high breaking strength and yet a relatively low weight and affords a minimum of capacitance effects to ground coupled with a compact arrangement of the messengers and the conductors.

While the invention has been disclosed herein in connection with certain embodiments and certain structural and procedural details, it is clear that changes, modifications or equivalents can be used by those skilled in the art; accordingly, such changes within the principles of this invention are intended to be included within the scope of the claims below.

I claim:

1. An open-centered spacer for cables which is adapted to be suspended from a normally grounded messenger cable and to support at least three conductor cables which spacer is nonmetallic, being made of an organic polymer and which spacer is a substantially symmetrical body having a minimum of discontinuities that may act as foci for corona discharge, said symmetrical body having four cable support platforms, one being adapted to be suspended from said messenger cable in locked relationship therewith and each of the remaining three supports being adapted to support a conductor cable, said messenger cable being, in view of the nonmetallic make up of said spacer, the nearest point of ground as to said conductor cables of which one is in a lowermost position on a support from the nearest point of ground and the other two of said cables being on supports located closer to said nearest point of ground but being so positioned that a conductor cable thereon is at a distance from said nearest point of ground which is at least two-thirds of the distance from said nearest point of ground to the conductor cable in said lowermost position, the combination of said structure of said spacer and said material of which it is made affording to said spacer a basic flash-over voltage strength that is in excess of 150,000 volts and a flash-over voltage strength that is at least 40,000 volts in a wetting period equivalent to about 5 inches of rainfall in one minute.

2. A spacer in accordance with claim 1 in which said polymer is polypropylene.

3. A spacer in accordance with claim 2 in which said spacer is a copolymer of propylene and ethylene.

4. A spacer in accordance with claim 1 in which said organic polymer has blended therein an organosiloxane gum.

5. A spacer in accordance with claim 4 in which said gum is present in amounts of about 1% to about 15% based on the total weight of all the polymeric material in the spacer.

6. A spacer in accordance with claim 5 in which said amount is about 2% to about 5%.

7. A spacer in accordance with claim 1 in which said symmetrical body has a relatively massive neck that terminates in side arms that are thinned down and afford said three supports for said conductor cables.

8. A spacer in accordance with claim 1 in combination with a locking device adapted to be mounted on said messenger cable and comprising an element having outside threads and containing a passageway that is adapted to receive a section of said messenger cable on which said spacer is to be supported, and a second element having internal threads and affording the placement and tightening of said second element on the said outside threads; and positionable in said passageway and adapted to be pushed into said passageway to bear against said section of said messenger cable a retractable, removable element that engages said cable section when present and locks it in position when said internally threaded element is sufficiently threaded on said element bearing the outside threads.

9. A spacer in accordance with claim 8 in which said retractable element is fixed to said second element.

10. A spacer in accordance with claim 8 in which said retractable element is fixed to said second element by a pin about which said second element revolves.

References Cited

UNITED STATES PATENTS

| | | | |
|---|---|---|---|
| 359,812 | 3/1887 | Pennie | 174—156 |
| 713,904 | 11/1902 | Murray | 174—156 |
| 802,397 | 10/1905 | Humphrey | 174—156 |
| 1,750,318 | 3/1930 | Kaiser | 174—156 |
| 2,927,147 | 3/1960 | Flower | 174—146 X |
| 3,084,892 | 4/1963 | Priestley et al. | 174—146 X |
| 3,121,069 | 2/1964 | Dietz | 260—827 |
| 3,300,576 | 1/1967 | Hendrix et al. | 174—146 |
| D. 197,010 | 12/1963 | Keltz. | |
| 3,268,655 | 8/1966 | Haigh et al. | 174—146 |

FOREIGN PATENTS 28,258  8/1921  Denmark.

OTHER REFERENCES

Quanah Co. Advertising pamphlet, received in U.S. Patent Office on Aug. 14, 1964, 4 pages. Copy in 174-146.

LARAMIE E. ASKIN, Primary Examiner

U.S. Cl. X.R.

174—168; 248—61; 260—827

UNITED STATES PATENT OFFICE
CERTIFICATE OF CORRECTION

Patent No. 3,456,066                                July 15, 1969

Charles L. Petze, Jr.

It is certified that error appears in the above identified patent and that said Letters Patent are hereby corrected as shown below:

Column 1, line 21, "messenger wire to" should read -- messenger wire is --; line 44, "capable" should read -- cable --. Column 5, line 10, "4 to 60" should read -- 4 at 60 --.

Signed and sealed this 21st day of April 1970.

(SEAL)
Attest:

Edward M. Fletcher, Jr.                            WILLIAM E. SCHUYLER, JR.
Attesting Officer                                       Commissioner of Patents